US009357118B2

(12) United States Patent
Moller et al.

(10) Patent No.: US 9,357,118 B2
(45) Date of Patent: May 31, 2016

(54) PHOTOGRAPH PREDICTION INCLUDING AUTOMATIC PHOTOGRAPH RECORDING WITH AUTOFOCUS AND METHOD

(75) Inventors: Ted Moller, Lund (SE); Ian Rattigan, Lund (SE); Fredrik Folkeryd, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 849 days.

(21) Appl. No.: 13/020,917

(22) Filed: Feb. 4, 2011

(65) Prior Publication Data

US 2011/0199470 A1 Aug. 18, 2011

Related U.S. Application Data

(60) Provisional application No. 61/304,797, filed on Feb. 15, 2010.

(51) Int. Cl.
*H04N 7/18* (2006.01)
*H04N 5/232* (2006.01)
(Continued)

(52) U.S. Cl.
CPC .............. *H04N 5/232* (2013.01); *G06F 1/1686* (2013.01); *G06F 1/1694* (2013.01); *G06F 3/017* (2013.01); *H04N 5/23219* (2013.01);
(Continued)

(58) Field of Classification Search
CPC .................................................. H04N 5/23219
USPC ............................... 348/61, 231.99, 69, 231.2
See application file for complete search history.

(56) References Cited

U.S. PATENT DOCUMENTS 8,624,998 B2 * 1/2014 James et al. ............... 348/231.2
2004/0070679 A1 * 4/2004 Pope ...................... 348/231.99
(Continued)

FOREIGN PATENT DOCUMENTS

| GB | 2416036 | | 1/2006 |
|----|---------|---|--------|
| GB | 2416036 A | * | 1/2006 |
| JP | 5328279 | | 12/1993 |

OTHER PUBLICATIONS

International Preliminary Report on Patentability for corresponding International Application No. PCT/IB2011/000252 dated Aug. 21, 2012.

(Continued)

*Primary Examiner* — Tung Vo
*Assistant Examiner* — Rowina Cattungal
(74) *Attorney, Agent, or Firm* — Renner, Otto, Boisselle & Sklar, LLP

(57) ABSTRACT

When a user removes a camera phone from a pocket or other storage location and raises it in a pre-defined motion in front of his face, the pre-defined motion activates the camera. When the camera phone decelerates/stabilizes in the user's hand in the correct orientation to take a picture, autofocus occurs and the camera automatically records images/photographs. When the user presses the shutter release, a camera application opens on the camera phone display to show the current image and that image is recorded. The previous automatically recorded images also may be available for viewing by the user. If after removing the camera from the storage location, the user does something other than pressing the shutter release, the automatically recorded images will be automatically discarded. When a brief photographic opportunity occurs and the user has little time to react, the photographic moment still can be captured.

21 Claims, 5 Drawing Sheets

(51) Int. Cl.
*G06F 1/16* (2006.01)
*G06F 3/01* (2006.01)
*H04N 101/00* (2006.01)

(52) U.S. Cl.
CPC ...... *H04M 2250/12* (2013.01); *H04M 2250/52* (2013.01); *H04N 2101/00* (2013.01)

(56) References Cited

U.S. PATENT DOCUMENTS

2006/0017692 A1 1/2006 Wehrenberg et al.
2009/0128682 A1* 5/2009 He et al. ........................ 348/345
2010/0128133 A1* 5/2010 Lee ............................ 348/208.5
2010/0309335 A1* 12/2010 Brunner et al. ............ 348/231.6
2011/0013034 A1* 1/2011 Chiang et al. .............. 348/222.1

OTHER PUBLICATIONS

International Search Report, corresponding to PCT/IB2011/000252, date of mailing Jun. 17, 2011.

Written Opinion of the International Searching Authority, corresponding to PCT/IB2011/000252, date of mailing Jun. 17, 2011.

* cited by examiner

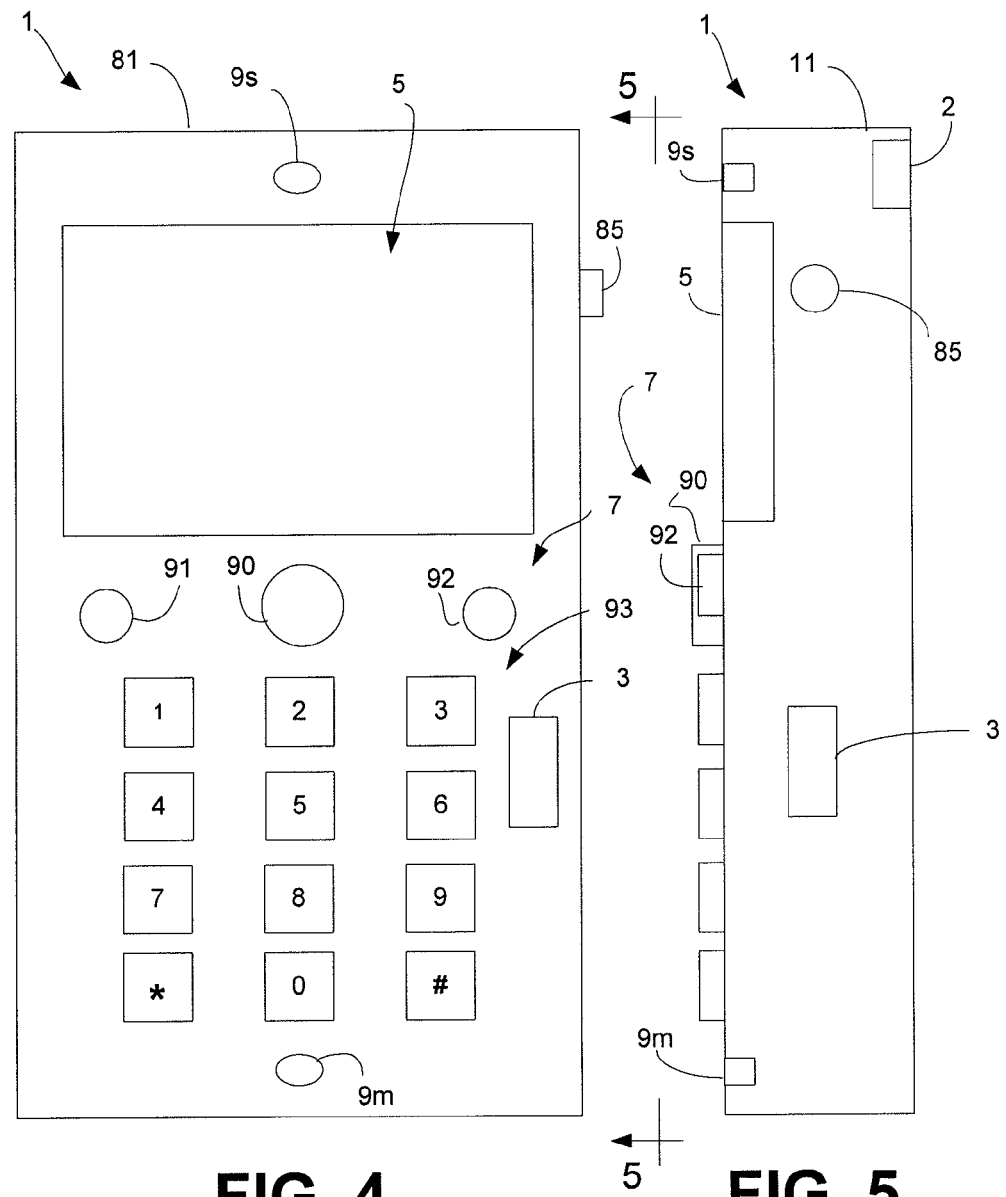

PHOTOGRAPH PREDICTION INCLUDING AUTOMATIC PHOTOGRAPH RECORDING WITH AUTOFOCUS AND METHOD

CROSS-REFERENCE TO RELATED APPLICATION

This application claims the benefit of U.S. Provisional Patent Application Ser. No. 61/304,797, filed Feb. 15, 2010, the entire disclosure of which is hereby incorporated by reference.

TECHNICAL FIELD

The present invention relates generally to electronic equipment with a photographic system and method and, more particularly, to photograph prediction based on a predefined or prescribed act of such electronic equipment including automatic photographic recording with autofocus and associated method.

BACKGROUND

Mobile and/or wireless electronic devices are becoming increasingly popular. For example; mobile telephones, portable media players and portable gaming devices are now in wide-spread use. In addition, the features and accessories associated with certain types of electronic devices have become increasingly diverse. To name a few examples, many electronic devices have cameras, text messaging capability, Internet browsing capability, electronic mail capability, video playback capability, audio playback capability, image display capability and hands free headset interfaces.

A problem today when taking pictures with a mobile phone camera is that it takes quite some time to start up the camera, focus, and take the picture. Many people store their mobile phone in their pocket or in a holster, e.g., a holster mounted on a belt; and in many instances the user locks the mobile phone to avoid inadvertently pressing a key and dialing an unintended phone number. To take a picture, the mobile phone has to be taken out of the pocket or holster; the phone has to be unlocked; and then the camera feature of the mobile phone has to be activated. Then the camera must be focused on the object intended to be photographed and the photograph may be taken by clicking the shutter release key (button, switch, and so on). By this time the photographic moment (also referred to sometimes as photographic opportunity), scene, and so on may have passed and the opportunity for a desired photograph is lost. Although the user of the mobile phone may quickly grab the mobile phone from the pocket or holster, these other mentioned activities waste time and the photographic opportunity may be lost as they are carried out. Although the above problem is pertinent to mobile phones that have camera functions, it also is pertinent to other camera devices, both still cameras and movie cameras.

SUMMARY

An aspect relates to a camera predicting when a user wants to take a picture based on deliberate movement and automatically starts capturing images, and the images may be saved or discarded.

An aspect relates to a camera predicting when a user wants to take a picture based on deliberate movement and automatically starts capturing images, and the images may be saved in a storage device, memory, buffer or the like and may be overwritten when the storage device is full.

An aspect relates to a camera predicting when a user wants to take a picture based on deliberate movement and automatically starts capturing images, and the user may choose to save or to discard those images.

Another aspect relates to using a shutter release function of a mobile phone camera or other camera to confirm operation in a camera mode to store images that have been automatically recorded prior to pressing or otherwise operating the shutter release.

Briefly, in accordance with an aspect of the invention, electronic equipment for capturing images, includes an image capturing device, a motion sensor configured to sense motion of the image capturing device, an analyzer configured to determine whether the sensed motion of the image capturing device is a predefined motion, and a control configured so as upon determining the motion is the predefined motion to cause automatically capturing images or preparing to capture images in response to the analyzer determining the sensed motion being a predefined motion.

According to another aspect, the control is configured such that preparing to capture images comprises automatically focusing the image capturing device for capturing an image, and said control being configured to prevent automatically capturing images until after the automatic focusing has been done.

According to another aspect, the electronic equipment includes a stabilization detector configured to determine whether the image capturing device is suitably stable for image capturing and wherein the control is configured to prevent capturing images until after the image capturing device has been detected as suitably stable for image capturing.

According to another aspect, the electronic equipment includes memory configured to store captured images in the memory.

According to another aspect, the control is configured to program the image capturing device whereby detecting motion of the image capturing device as sensed by the motion sensor as a representation of a predefined manner establishes a predefined motion, and further comprising memory configured to store a representation of the predefined motion.

According to another aspect, the electronic equipment includes a comparator configured to compare the sensed motion with a representation of predefined motion.

According to another aspect, the analyzer responds to sensing motion that is representative of decisively removing the image capturing device from a prescribed location.

According to another aspect, the motion sensor comprises an accelerometer.

According to another aspect, the control is configured to cause images from the image capturing device to be recorded as a sequence of images in response to the analyzer determining the motion is the predefined motion and the image capturing device is suitably focused and stable to record images.

According to another aspect the electronic equipment includes a shutter release, and wherein the control is configured to respond to the shutter release being operated so as to record an image and to cease the automatic recording of a sequence of images.

According to another aspect, the electronic equipment includes a display, and the control is configured to cause the display to display a number of a sequence of automatically recorded images and an image recorded in response to operating of a shutter release of the image capturing device.

According to another aspect, the control is configured such that in response to a function of the electronic equipment being selected other than an image capturing function, automatically recorded images are discarded and image capturing function is stopped.

According to another aspect, the electronic equipment is a mobile phone.

Briefly according to another aspect, a method for capturing images, includes sensing motion of an image capturing device, determining whether the sensed motion of the image capturing is a predefined motion, and upon determining the motion is the predefined motion automatically capturing images and/or preparing to capture images.

According to another aspect the preparing to capture images includes automatically focusing the image capturing device for capturing an image and determining whether the image capturing device is suitably stable for capturing images, and said automatically capturing images comprising commencing automatically capturing images after the automatic focusing has been done and the image capturing device is suitably stable.

According to another aspect the method includes programming the image capturing device by moving the image capturing device in a decisive manner to establish one or more predefined motion(s) and storing a representation of the predefined motion(s) and/or to modify or to add to previously stored predefined motions.

According to another aspect, the determining whether the sensed motion of the image capturing is a predefined motion includes comparing the sensed motion with a representation of the predefined motion.

According to another aspect, upon determining that sensed motion is a predefined motion and completing of focusing and stabilizing of the image capturing device, automatically recording a sequence of images.

According to another aspect, the method includes in response to a shutter release of the image capturing device being operated, ceasing the automatic recording of the sequence of images, displaying a current image on a display of the image capturing device and recording the image being sensed by the image capturing device and shown on the display.

According to another aspect, the image capturing device is a camera or a mobile phone, and further comprising while images are being automatically captured by the image capturing device, in response to a function of the camera or mobile phone being selected that is other than a shutter release function, ceasing automatically capturing images or preparing to capture images and discarding images that were automatically recorded as a sequence of images immediately preceding such function having been selected.

An additional aspect of the invention includes electronic equipment for capturing images includes motion sensor configured to sense motion of an image capturing device, analyzer configured to determine whether the sensed motion of the image capturing is a predefined motion, and control configured so as upon determining the motion is the predefined motion to cause automatically capturing images or preparing to capture images.

Other aspects are summarized below:

Another aspect relates to the control being configured such that preparing to capture images includes automatically focusing the image capturing device for capturing an image.

Another aspect relates to the control being configured to commence automatically capturing images after the automatic focusing has been done.

According to another aspect, the electronic equipment includes a stabilization detector configured to determine whether the image capturing device is suitably stable and the control is configured to commence capturing images only after the image capturing device is suitably stable.

According to another aspect, the electronic equipment includes a memory configured to store captured images in the memory.

According to another aspect, the electronic equipment includes a detector configured to detect motion of the image capturing device.

According to another aspect, the electronic equipment includes a programming device configured to program the image capturing device by detecting motion of the image capturing device in a predefined manner to determine a predefined motion and memory storing a representation of the predefined motion.

According to another aspect, the electronic equipment includes a comparator configured to compare the sensed motion with a representation of the predefined motion.

According to another aspect, the predefined motion is a motion representative of a motion removing the image capturing device from storage.

According to another aspect, physical motion of electronic equipment from a position or location indicative of being in an idle (or not image capturing) state towards a position indicative of capturing images is used to initiate image capturing function, to set up the electronic equipment or to begin setting up the electronic equipment for image capturing, or to commence capturing images.

According to another aspect, the detector of motion responds to detection motion that is representative of decisively removing the image capturing device from a pocket, from a storage holster, from a handbag, from a strap or the like.

According to another aspect, the detector includes an accelerometer.

According to another aspect, the electronic equipment includes a control configured such that in response to detecting of prescribed motion and completing of focusing, a sequence of photographs automatically is recorded.

According to another aspect, the electronic equipment includes a shutter release, and the control configured to respond to the shutter release of the image capturing device being operated so as to record an image and to cease the automatic recording of a sequence of photographs.

According to another aspect, the control configured to respond to the shutter release, button, key (e.g., real or virtual as on a touch screen) or the like (collectively referred to below as "shutter release") being operated to cause displaying of a current image on a display of the image capturing device and recording the image being sensed by the image capturing device and shown on the display.

According to another aspect, the shutter release and control are configured such that operating of a shutter release of the image capturing device confirms intention to take and record images.

According to another aspect, the control is configured to display a number of a sequence of automatically recorded images and an image recorded in response to operating of the shutter release.

According to another aspect, the control is configured such that in response to a function being selected by the image capturing device other than an image capturing function automatically recorded images are discarded, active image capturing function is terminated, and the image capturing device responds to the selected function.

According to another aspect, the image capturing device includes a still image camera or a moving image camera.

According to another aspect, the image capturing device is an electronic digital camera.

According to another aspect, the image capturing device is a part of a mobile phone.

According to another aspect, the electronic equipment is a mobile phone including the image capturing device.

Another aspect of the invention relates to a method for capturing images, including sensing motion of an image capturing device, determining whether the sensed motion of the image capturing is a predefined motion, and upon determining the motion is the predefined motion automatically capturing images or preparing to capture images.

According to another aspect, the preparing to capture images includes automatically focusing the image capturing device for capturing an image.

Another aspect relates to commencing automatically capturing images after the automatic focusing has been done.

Another aspect relates to determining whether the image capturing device is suitably stable and commencing capturing images only after the image capturing device is suitably stable.

Another aspect relates to storing captured images in a memory.

Another aspect relates to detecting motion of the image capturing device.

Another aspect relates to programming the image capturing device by moving the image capturing device in a predefined manner to determine a predefined motion and storing a representation of the predefined motion.

According to another aspect, the determining whether the sensed motion of the image capturing is a predefined motion includes comparing the sensed motion with a representation of the predefined motion.

According to another aspect, the predefined motion is a motion representative of a motion removing the image capturing device from storage.

According to another aspect, the motion representative of a motion removing the image capturing device from storage is motion representative of decisively removing the image capturing device from a pocket or from a storage holster.

Another aspect relates to detecting motion of the image capturing device using an accelerometer or other motion detector.

According to another aspect, upon detecting of prescribed motion and completing of focusing, a sequence of photographs automatically is recorded.

According to another aspect, in response to the shutter release of the image capturing device being operated, the automatic recording of a sequence of photographs ceases.

According to another aspect, in response to the shutter release being operated displaying a current image on a display of the image capturing device and recording the image being sensed by the image capturing device and shown on the display.

According to another aspect, operating of a shutter release of the image capturing device confirms intention to take and record images.

Another aspect relates to displaying a number of a sequence of automatically recorded images and an image recorded in response to operating of the shutter release.

Another aspect relates to in response to a function being selected by the image capturing device other than an image capturing function, terminate active image capturing function, and responding to the selected function.

Another aspect relates to in response to a function being selected by the image capturing device other than an image capturing function, discarding automatically recorded images, terminate active image capturing function, and responding to the selected function.

Another aspect relates to carrying out recording of images using either a still image camera or a moving image camera.

Another aspect relates to using an electronic digital camera as the image capturing device.

Another aspect relates to using a mobile phone having a camera function to carry out the image capturing.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

In the annexed drawings:

FIG. 4 is a front view of electronic equipment including an image capturing device in the form of a mobile phone;

FIG. 5 is a schematic side elevation view of the mobile phone looking in the direction of the arrows 5-5 of FIG. 4;

DESCRIPTION

The interchangeable terms "electronic equipment" and "electronic device" include portable radio communication equipment. The term "portable radio communication equipment," which hereinafter is referred to as a "mobile radio terminal," as "portable electronic equipment," or as a "portable communication device," includes all equipment such as mobile telephones, pagers, communicators, electronic organizers, personal digital assistants (PDAs), smartphones, portable communication apparatus or the like.

In the present application, embodiments of the invention are described primarily in the context of a portable electronic device in the form of a mobile telephone (also referred to as "mobile phone"). However, it will be appreciated that the invention is not intended to be limited to the context of a mobile telephone and may relate to any type of appropriate electronic equipment, examples of which include those described above and elsewhere herein as well as a media player, a gaming device, PDA, a computer, digital cameras, etc.

Figure 1:
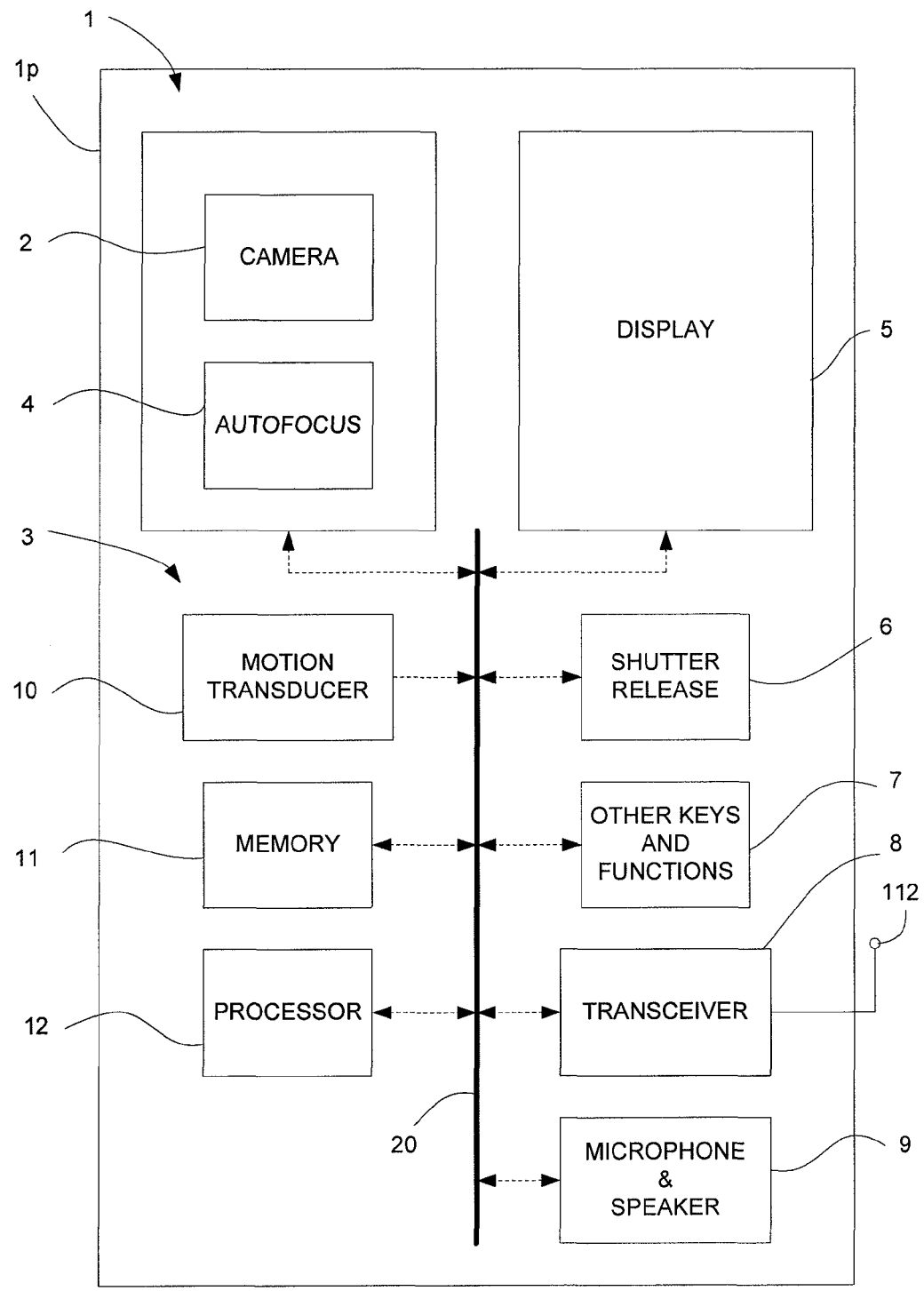
FIG. 1 is a schematic illustration of electronic equipment in the form of a mobile phone, for example, with an image capturing device and operative method according to an exemplary embodiment.

Referring in detail to the drawings, and initially to FIG. 1, electronic equipment in the form of an image capturing device 1 embodied in a portable communication device 1p in accordance with an embodiment of the present invention is illustrated schematically. The terms image capturing device, electronic equipment and mobile phone may be used equivalently and interchangeably herein unless otherwise expressed or implied by context. The image capturing device 1 includes a camera 2 and operating circuitry 3. Associated with the camera is an autofocus device 4.

The portable communication device 1p will be referred to below as a mobile phone 1p. However, as was mentioned above, reference to "mobile phone" includes various other devices, such as, for example, those mentioned above. In outward appearance, for example, as is illustrated in FIGS. 4 and 5, the mobile phone 1p is of one type of design or style; however, the features of the invention, as are described in further detail below, may be used in other types of mobile phones, such as those that include cases that open and close (sometimes referred to as a "flip phone," "sliding phones," etc.), and various other mobile phones that currently exist or may come into existence in the future. The portable electronic device 1p may be any of many different types of such devices.

As illustrated in FIG. 1, the image capturing device 1 includes a display 5, shutter release 6, other keys and functions 7; and if the image capturing device 1 is embodied in a mobile phone 1p, the image capturing device (or the mobile phone) also includes a radio or transceiver 8, and microphone and speaker 9. These are connected in the operating circuitry 3. Also connected in the operating circuitry are a motion transducer 10, memory 11, and processor 12. The motion transducer 10 senses (also referred to as "detects") motion of the device 1. The processor 12 is an analyzer 13 or may include an analyzer section or a separate analyzer; the analyzer 13 is configured to determine whether sensed motion (also referred to as "detected motion") is a predefined motion, as is described further below. For example, as an analyzer 13 configured in combination with instructions, such as computer code, logic, program or the like, in the memory 11 or otherwise provided, such processor or analyzer determines whether sensed motion of the image capturing device is a predefined motion.

One or more electrically conductive paths, wires, electrical bus, etc., designated 20 couple the respective parts of the operating circuitry 3 for operation in the image capturing device 1.

The camera 2 may be a conventional camera used in a mobile phone or may be another camera. The image capturing device 1 may be embodied as a digital camera that is not a mobile phone or part of a mobile phone.

The autofocus 4 may be a conventional autofocus for electronic cameras. Also, the autofocus may be eliminated in the event a manual focus or a fixed focus camera 2 is employed. The display 5 may be a conventional display used in a mobile phone, digital camera or other portable electronic equipment. If desired, the display may be a touch sensitive display. The shutter release 6 may be a key or button or touch pad or part of a touch sensitive screen, etc. The other keys and functions 7 may be those typically found in a mobile phone, smart phone, PDA, digital camera, digital movie camera, etc. that can be operated by a user to carry out various functions of the device, e.g., to start a camera function, for example, to record, to capture, to take, etc. one or more photographs, videos, etc. (reference to these terms record, capture, take, and so on, are used interchangeably and equivalently in the sense that photographs, videos, movies, and so on may be recorded, captured, taken, and so on. Also, the terms picture, photograph, movie and video may be used interchangeably and equivalently herein unless otherwise indicated expressly or by context.) The transceiver 8 may be a conventional radio used in a mobile phone or other communication device. The microphone and speaker 9 may be a typical microphone and speaker used in a mobile phone or other device in which sounds may be input and/or output.

The motion sensor (also referred to as a motion transducer) 10 may be an accelerometer or other device that senses motion of the device 1 and provides electrical signals representing the motion, e.g., direction/vector, speed, acceleration, etc. The memory 11 may be one or more memories that stores images, operating programs and applications for the device 1, contacts list and/or other contact information, calendar, and/or data, and so on. The memory may be a buffer, a long term memory, such as a programmable read only memory, an erasable programmable memory, a non-transitory memory and so on.

In operation the device 1 may be used for taking photographs (also referred to as "recording" images, and so on). As a mobile phone 1p embodiment, the device 1 may be operated for communication, e.g., via telephone and voice, via email, via messaging, via Internet, and so on. The other keys and functions 7 may be used to provide inputs from the user of the device 1. Inputs also may be provided via a touch sensitive display 5.

For the purposes of this description, the various parts of the device 1 may be used in conventional manner with the addition or exception of the following description relative to the image capturing device 1.

Summarizing operation of the image capturing device 1, consider that the device 1 is stored at rest, e.g., in a storage location such as pocket of a person, in a storage holster, in a handbag, or even resting on a table or some other place, and the camera function is not then operating to record images. Then, the device is moved with a predefined motion. The motion transducer 10, e.g., one or more accelerometers, senses the motion and provides signals representing such motion. The processor 12 compares such motion to a predefined motion that previously was obtained, e.g., stored in the memory or elsewhere stored and/or represented. If the detected motion is sufficiently similar to or the same as the predefined motion, then the camera 2 and autofocus 4 are activated. For example, the camera 2 is readied to record or to capture images that are to be stored, e.g., in the memory 11. The motion transducer 10 alone, and/or including the processor 12 appropriately configured to sense signals representing motion, and is configured as a stabilization detector to detect stabilizing of the device 1 sufficient for recording images by the camera, e.g., to avoid motion blur and so on. The autofocus 4 focuses on an object intended to be photographed in focus. Thus, the control is configured to prevent taking (recording) of images until there is suitable focusing and stabilizing of the image capturing device 1. Upon suitable stabilization and focusing sufficient to record suitable or satisfactory images, the operating circuitry 3 is configured to operate the camera 2 to commence automatic recording (sometimes referred to as "capturing") images, e.g., taking of a sequence of images.

At this point it may not be clear that the user intends to use the camera function/image recording function of the device 1. It may be that the user intends to make a phone call or to carry out some other application using the device 1, as often may be the case for a smart phone, a PDA, and so on.

However, if the user presses or otherwise operates the shutter release 6 to to confirm intention to use the device 1 in the image recording mode, then one or more of the automatically recorded images is designated for saving and/or is saved in memory, and the current image being sensed by the camera 2 at that time also may be recorded. Although reference is made to a shutter release or shutter release key 6, it will be appreciated that any button or key that indicates an intention to take or to record a picture, a movie or the like may be used to start a camera function in accordance with the described apparatus and method hereof. Further the display 5 may be operated to show one or more of the images, including the current image and one or more of the previously automatically recorded images from the sequence of images that were recorded automatically.

The user may view various images and select from those images for longer term storage, for transmission via email or messaging, etc.

However, if the user does not press the shutter release to confirm intention to record images and instead presses one or more other keys 7 or selects functions represented by one or more keys and/or shown on the display 5, etc., then the automatic recording of images ceases, e.g., under control of the processor, and the immediately previously automatically recorded sequence of images may be discarded from memory 11 so as not to use up memory space or may be saved, e.g., in a buffer or other storage, until the memory space is otherwise needed. A number of such images may be retained in memory as may be desired, and respective images may be erased and replaced as new images are obtained, e.g., on a first in first out (FIFO) or on some other basis.

Thus, it will be appreciated that the predefined motion causes the camera to get ready to take a picture promptly. Pressing or otherwise actuating the shutter release 6 confirms intention to take a picture. Therefore, there is no need to spend time to set up the camera 2 for taking the picture while the photographic opportunity dissipates or goes away entirely.

In an embodiment, part of setting up the device 1 for capturing images is to give focus to the image capturing function as shown on the user interface, e.g., when the phone display 5 acts as a viewfinder). For example, an integral part of confirming the intention to take a picture would be to point the viewfinder towards the subject, e.g., pointing the image sensor toward the subject so the image can be seen in the display 5, before the user "snaps" the image (picture) by pressing the shutter release. In such a case, therefore, the predefined motion would also (if triggered) need to give focus to the camera application of the device 1, e.g., show the viewfinder (show the image on the display) to enable the user to give confirmation under reasonable circumstances that the image is suitably or satisfactorily (acceptably) in focus. This feature avoids the need for the user having to shoot (take or record) the image "blindly" (without visually checking focus) and would lead to a requirement for a physical dedicated shutter release to be operated to take the picture, to set up the camera application and/or to initiate the focusing function, which be disadvantageous, e.g., because of the time required and/or because some devices do not have a shutter release key (button).

If the viewfinder gets focus from the predefined motion, in accordance with an embodiment of the invention, it may be provided with a mechanism to cause the viewfinder and image capturing function(s) to stand down, cancel, stop or turn off, e.g., if the user's intent actually was to make a phone call or carry out some other function or application. The stand down function may be initiated or triggered by another predefined "cancel" motion, e.g., like shaking the phone or some other predefined motion.

Figure 2:
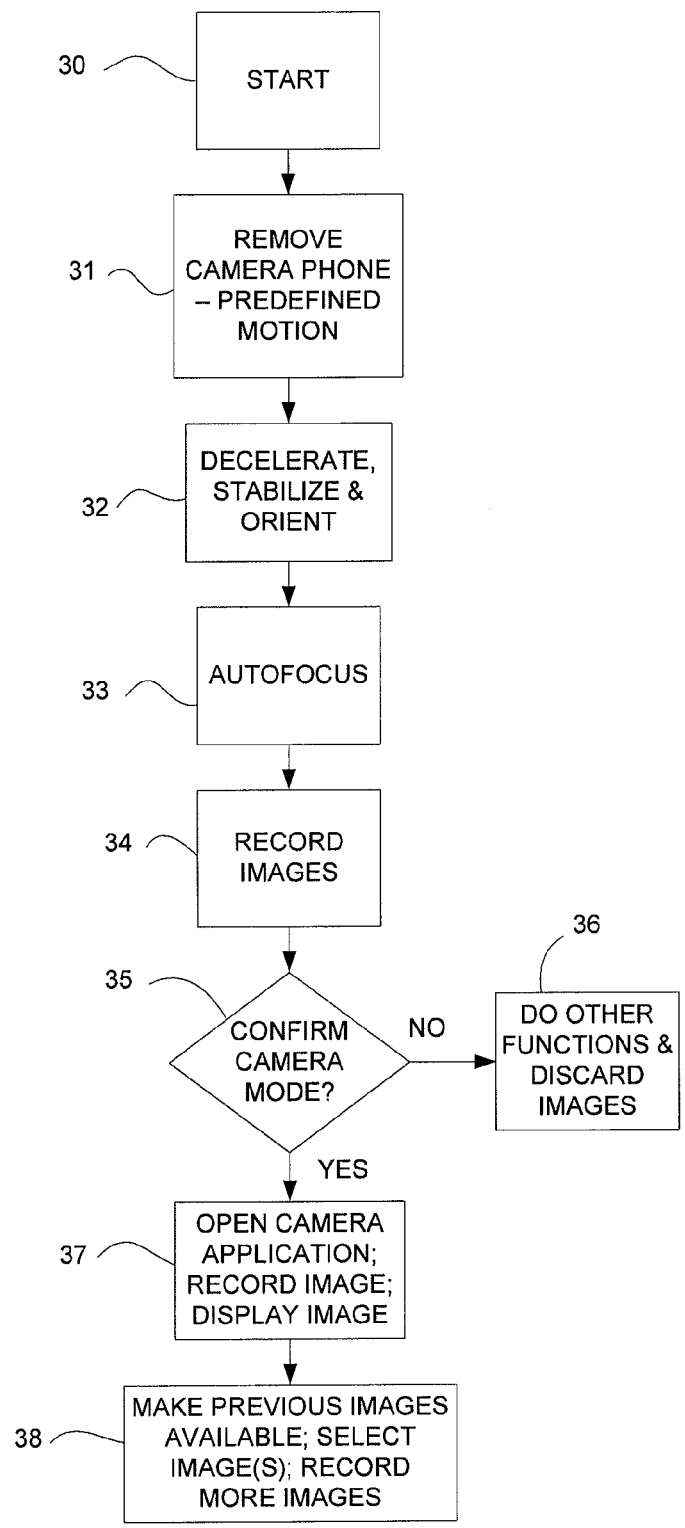
FIG. 2 is a schematic flow chart or logic diagram representing operation of an embodiment.

In FIG. 2 is a functional block diagram, logic diagram or flow chart 29, illustrating an example of operation of the image capturing or acquisition device 1. The term "block" herein may be understood as meaning one or more steps that are briefly identified by the wording in the respective block and more fully described in the text hereof.

Briefly the image acquisition device 1 predicts when the user wants to take a picture based on deliberate movement of the device in a predefined or predetermined manner and starts capturing images; and the user then may choose to save or to discard those images.

At block 30 the image acquisition device 1 is in a start mode, e.g., the device 1 is turned on but is not necessarily operating to carry out image capturing or acquisition or recording of still pictures (photographs) or movies functions. At block 31 the user removes the device 1 from storage, e.g., from the user's pocket, from a holster, from a surface, etc. If such removing is a predefined motion, then, the camera 2 begins setting up automatically. At block 32 the device 1 decelerates, stabilizes and is oriented, e.g., in front of the face of the user who wishes to take one or more photographs or movies, e.g., to record one or more images. At block 33 autofocus is carried out. At block 34 images are recorded automatically.

At block 35 an inquiry is made whether camera mode or image capturing mode is confirmed, e.g., by pressing of or otherwise operating the shutter release 6. If not, then at block 36 other functions are carried out, e.g., a different key 7 is pressed, for example, to make a phone call; and temporarily recorded images are discarded. If camera mode, e.g., image capturing mode, is confirmed, e.g., by the user pressing the shutter release 6, then at block 37 the full camera application is opened; the current image is recorded, and one or more of the previously automatically recorded images are saved in memory for subsequent viewing, and additional images may be selectively recorded, as is represented at block 38. One or more images may be recorded automatically after the shutter release has been operated and confirms the electronic equipment is operating in camera (photographing) mode.

When the user removes the device 1 from the stored location, e.g., from his pocket, and raises it to a position as though to take a picture, e.g., to a position in front of his face, the camera 2 is activated. Such motion may be referred to as a predefined motion. The motion may be carried out by the user, and the motion transducer 10, e.g., an accelerometer, may provide signals output to represent such motion.

A user may initialize the device 1 (sometimes referred to as to program or to train the device 1) to establish a predefined motion for subsequent use, for example, to obtain and to store signals representing the predefined motion. For example, the user may remove the device by hand or by some other means from a stored location and/or orientation, e.g., from a pocket, holster, table, and so on, and move the device in a manner to exemplify or to create or to establish the predefined motion and, thus, signals from the accelerometer 10 or the like representing such predefined motion. For example, the manner of movement may be that of taking the device 1 from a shirt pocket, from a holster, from a resting on a surface, e.g., a table, condition, and so on, and moving the device 1 to a location and orientation to take one or more pictures, e.g., record images, such as by moving the device 1 to a location in front of the face or eyes of the user, etc. The motion may be a decisive motion, e.g., one that is relatively quick or fast, one that has relatively sharp changes in direction, one that relatively abruptly stops, and so on, so that it is relatively easy to distinguish between signals representing the predefined motion and motion due to simply carrying the device 1 in a person's pocket, to resting on a seat in a vehicle, or to being handed from one person to another to show the device to the other person.

If the device 1 is programmed or trained prior to the user obtaining the device, the user may do the initial programming or training to establish the predefined motion.

The device 1 may be programmed before the user acquires it, e.g., purchases it. For example, the device 1 may be programmed to establish one or more predefined motions during manufacturing of the device, e.g., at the factory or at the dealer, distributor or the like (collectively referred to as "factory-stored" predefined motion(s)). For example signals, logical connections or the like, which represent one or more than one respective predefined motions may be stored in the device 1, e.g., in memory 11, in circuitry of the device or elsewhere. The user may modify the predefined motion(s) by overwriting the signals representing the factory-stored predefined motion and/or may add additional predefined motions to the device 1 by the user programming the device 1 as described herein.

The signals representing the predefined motion may be stored for subsequent comparison with motions that are detected subsequently to determine whether a given motion is the same as or is sufficiently similar to the predefined motion so as to operate the camera 2 of the device 1. There may be several predefined motions, such as, for example, a motion moving the device 1 from a shirt pocket to a position to take a picture, a motion moving the device from a holster to a position to take a picture, from a table to a position to take a picture, and so on. Signals representing the predefined motions may be stored when the device 1 first is used, e.g., initialized, and/or at other times when the user desires to add or to change one or more predefined motions. The signals representing the predefined motion may be stored in a memory, e.g., the memory 11, which is mentioned elsewhere herein.

Thus, it will be appreciated that when the device 1 detects that the predefined motion has occurred, the camera 2 is activated, but the display 5 may not be activated to show the image currently being received by the camera. When the device 1 decelerates and stabilizes sufficiently so that the autofocus 4 may work properly and/or so that suitable images can be recorded, e.g., without undesired blurring due to motion, the camera 2 may carry out a searching for focus areas—and the autofocus 4 focuses the camera. After focus has occurred, the camera 2 may snap or otherwise record a number of images, e.g., photographs. The user still may not be shown an indication on the display 5 that the camera has taken the photographs. However, when the user presses the shutter release 6 or some other key, switch, etc. to indicate intent to take/record a picture or movie, the camera application of the device 1 will to open and start the camera function and one or more photographs will be taken and recorded or stored. The image of the photograph may be shown on the display 5. The previously automatically taken photographs also will be available. The user may choose to keep or to discard the previously automatically taken photographs and, if desired, also may discard the photograph(s) taken as a result of pressing the shutter release. The photographs may be stored in a buffer or other memory or device; when the buffer is full, subsequent photographs may overwrite previously stored photographs. If the user wishes to take more photographs, he can press the shutter release 6 again in the normal way.

However, if after removing the device 1 from a pocket or other storage location, the user chooses to do something other than pressing the shutter release 6, for example, pressing one or more keys unlocking the phone and sending a message or making a phone call, the previously automatically take photographs will automatically be discarded, thus saving memory space.

In an embodiment, the final phase of the predefined motion may indicate the likely intent to take pictures (capture images) based on the physical orientation of the device 1, such as, for example, motion and/or orientation such that the device is held like a camera. In this case, the viewfinder application may be activated so that the user can confirm that the camera function automatically has been set up or is in the process of being set up to take pictures; otherwise the user may not realize that the camera has been set up or is being set up to take pictures, and the user may take further steps, e.g., undertake typical or normal procedure of prior camera devices, of setting the camera up (e.g., starting the camera application), which otherwise would be unnecessary using the invention. For example, on the one hand, if it does not appear to a user that the camera is on, the user might not think it was on and then might lose the moment of the image while trying to set up the camera manually. On the other hand, if the final phase of the predefined motion of the device 1 does not match the expected orientation of a camera (such as holding the device with the display showing it is ready to dial a telephone number), the viewfinder would not take focus (e.g., the focusing function of the device 1 would not try to carry out a focusing function and the image may not be shown in the display 5). Also or alternatively there may be a quick way of cancelling image capturing use so the device 1 would return to an idle condition or mode and/or for other applications or functions may be carried out.

As a result of the foregoing, it will be appreciated that when something happens that the user wishes to photograph, and the user has very little time to react to take the photograph, the user still may manage to capture the image/photograph on the device 1 before the opportunity passes. The automatic photograph recording function of the invention occurs in response to the predefined motion and/or suitable stabilizing of the device 1 and may provide for capturing such images quickly before the opportunity passes.

Figure 3:
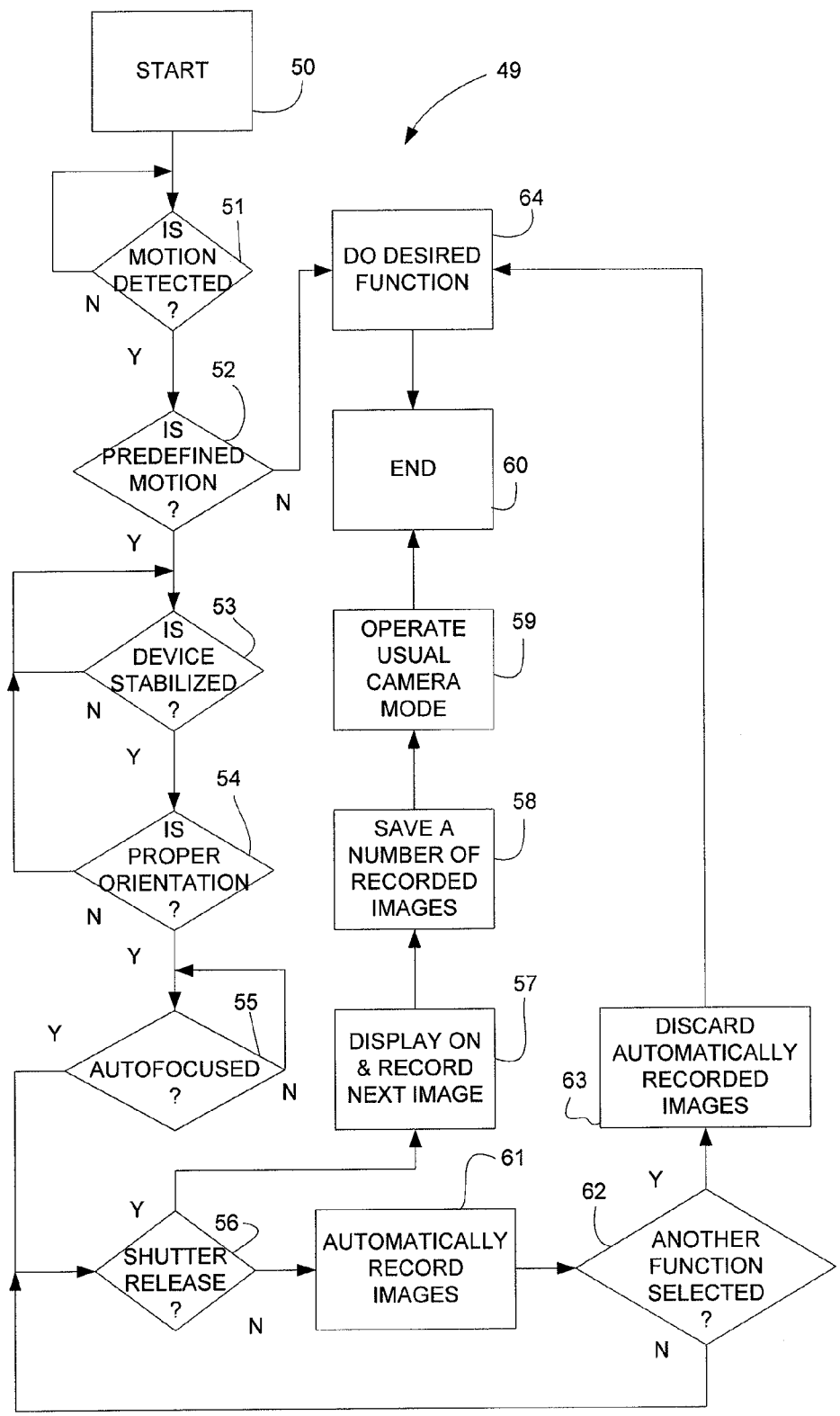
FIG. 3 is a schematic flow chart or logic diagram representing respective steps according to an embodiment.

Turning to FIG. 3, a flow chart or logic diagram representing operation of the image capturing device 1 is illustrated at 49. At block 50 the logic starts. At block 51 an inquiry is made whether motion is detected, e.g., by the motion transducer 10. If yes, then at block 52 an inquiry is made whether the motion is the predefined motion.

If yes, then at block 53 an inquiry is made whether the device 1 is stabilized; and, if yes, at block 54 an inquiry is made whether the device is properly oriented to take pictures. If yes, then at block 55 the autofocus function is carried out. When autofocus is completed an inquiry is made at block 56 whether the shutter release 6 has been operated or whether there is some other indication that the user desires to do photographic recording. If yes, then at block 57 the display 5 is turned on to show the current image and the current image that is sensed by the camera, e.g., a CCD or other camera or image sensing device, is recorded, e.g., it may be stored in the memory 11. At block 58 one or more recorded images are saved. At block 59 the camera 2 is operated in usual camera mode. At block 60 when the camera mode no longer is desired, the routine 49 ends.

At block 51 a loop is provided until motion is detected. At blocks 53, 54 and 55 loops are provided until the respective inquiries are affirmative, as illustrated. At block 56 if the shutter release has not been operated, then at block 61 images are automatically recorded, e.g., a number of images, also referred to as a sequence of images, are recorded. At block 62 an inquiry is made whether another function, e.g., other than shutter release or indication of desire to do photographic recording, is selected, e.g., by operating keys and/or functions 7. If not, the loop back to block 56 is followed. If yes, then at block 63 the automatic recording of images is ceased, e.g., under control of the processor 12, and sequence of automatically recorded images, e.g., those that that already were automatically recorded are discarded, as was mentioned above, and the system returns to block 64 to do the desired function selected by the keys or other functions 7. At block 52 if the motion is not the predefined motion, then the desired function subsequently selected is/are carried out at block 64; and eventually the routine ends at block 60, as is illustrated.

As an example, the image capturing device (also sometimes referred to as an image acquisition device) 1 is in the form of a portable electronic device, such as a mobile phone 1*p* illustrated in FIG. 5. The mobile phone 1*p* includes case (housing) 81, speaker 9*s*, microphone 9*m*, display 5, e.g., liquid crystal display, light emitting diode display, or other display, on/off switch 85, and a number of keys generally indicated at 7. The keys 7 may include a number of keys having different respective functions. For example, the key 90 may be a navigation key, selection key or some other type of key; the keys 91, 92 may be, for example, one or more soft switches or soft keys; and the keys 93 may be dialing keys. As an example, the navigation key 90 may be used to scroll through lists shown on the display 5, to select one or more items shown in a list on the display 5, etc. The soft switches 91, 92 may be manually operated to carry out respective functions, such as those shown or listed on the display 5 in proximity to the respective soft switch or selected by the navigation key 90, etc. The display 5 may include a GUI on which a number of different icons representing respective functions, applications or the like (collectively referred to as functions below), e.g., camera, email, calendar, contacts, messages, games, etc., and the navigation key 90 may be used to point to a given function, application, etc., and either the navigation key and/or the soft keys, for example, may be used to select the function to cause it to carry out its task or the like. If the display 5 is a touch sensitive display, the pressing of an icon also can select the given function or application represented by the touched icon. The soft keys 91, 92 may be used to initiate a phone call, e.g., to connect to a wireless telephone circuit and to transmit a telephone number, etc., to answer an incoming phone call, to take a photograph (e.g., to provide a shutter release function to store electronically an image received by the camera 2 lens, to transmit a text message, etc., to end a phone call, and/or to carry out other functions.

The dialing keys 93 may be used to dial a telephone number or to input alphanumeric or other data. The speaker 9*s*, microphone 9*m*, display 5, and keys 7 may be used and function in the usual ways in which a mobile phone typically is used, e.g. to initiate, to receive and/or to answer telephone calls, to send, to receive and to review text messages and email, to connect with and carry out various functions via a network, such as the Internet or some other network, to beam or otherwise to transfer information between mobile phones, etc. These are examples; there may be other uses that currently exist or may exist in the future. The mobile phone 1 also includes operating circuitry 3 (schematically illustrated in FIG. 1 and shown in further detail in FIG. 6) that responds to programming and to inputs, e.g., provided by a user pressing a key or applying a stylus or finger to a touch-sensitive screen of the display 5, etc. or provided from an external source, such as an incoming telephone call or text message, to carry out functions of the mobile phone.

Figure 6:
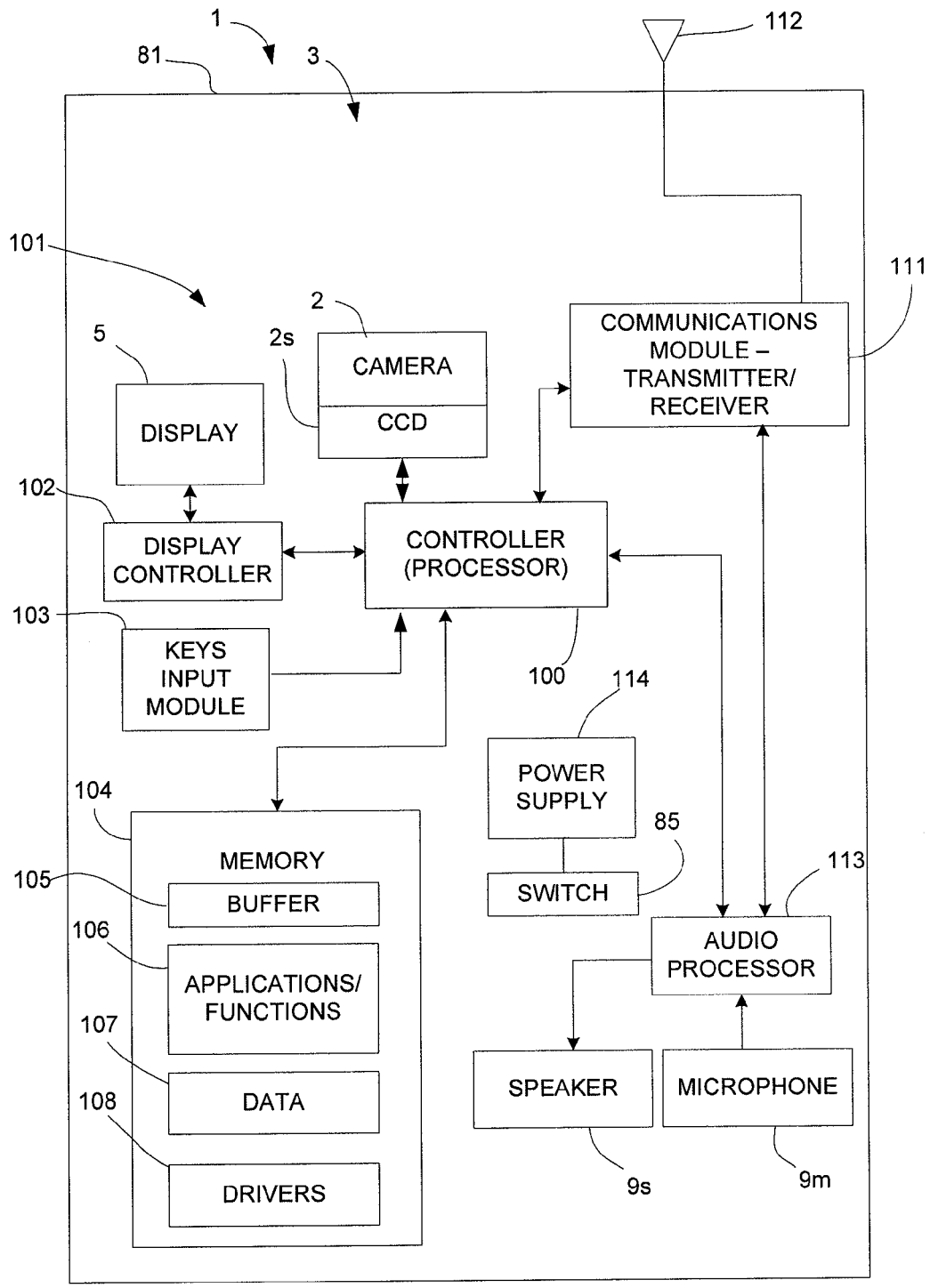
FIG. 6 is a schematic system diagram of circuitry and associated parts of the mobile phone for carrying out operation thereof in a manner described below.

Briefly turning to FIG. 6, a schematic block diagram of the operating circuitry or system 3 of the mobile phone 1 is illustrated. The illustration is exemplary; other types of circuitry may be employed in addition to or instead of the operating circuitry 3 to carry out the camera or photographic functions described in further detail herein, e.g., as is described with respect to FIGS. 1-3, and the various telecommunication and other functions of a mobile phone. The operating circuitry 3 includes a controller 100 (sometimes referred to as a processor, e.g., processor 12, or as an operational control and may include a microprocessor or other processor device and/or logic device) that receives inputs and controls the various parts and operation of the operating circuitry. An input module generally shown at 101 provides inputs to the controller 100. The input module includes the camera 2, a display controller 102, and a keys input module 103 and possibly other input devices and/or connections that provide inputs to the controller 100.

The camera 2 may include a lens, shutter, image sensor 2*s*, e.g., a digital image sensor, such as, for example, a CCD (charge coupled device), a CMOS device, or another image sensor. Images that are sensed by the image sensor may be provided the controller 100 for use in the manner described further below. The camera 2 also may be associated with a shutter release mechanism, one example of which is the navigation key that may function to in a sense "take a picture" when it is pressed by a user while the mobile phone 1 is operating in a photographic mode (sometimes referred to as camera mode). As is described in further detail herein, pressing the shutter release button (e.g., the navigation key 90, a soft key 91 or 92, an icon shown on the display 5, or some other key (shown or not shown in the drawings) when the mobile phone 1 is in camera mode) would save in a buffer, for example, the current image being sensed by the image sensor. Pressing the shutter release button also provides the above-described confirmation of camera mode, e.g., as is described with respect to the block 56 and associated parts of FIG. 3.

The display controller 102 responds to inputs from a touch sensitive display 5 or from another type of display that is capable of providing inputs to the controller. Thus, for example, touching of a stylus or a finger to a part of a touch sensitive display, e.g., to select a song in a displayed list of songs, to select a contact in a displayed list of contacts, to select an icon or function in a GUI shown on the display may provide an input to the controller in conventional manner. The display controller 102 also may receive inputs from the controller 100 to cause images, icons, information, etc., to be shown on the display 5. The keys input module 103, for example, may be the keys 7 themselves and/or may be signal conditioning, decoding or other appropriate circuitry to provide to the controller 100 information indicating the operating of one or more keys 7 in conventional manner.

A memory 104 is coupled to the controller 100. The memory may be a solid state memory, e.g., read only memory (ROM), random access memory (RAM), SIM card, etc., or memory that maintains information even when power is off and that can be selectively erased and provided with more data, an example of which sometimes is referred to as an EPROM or the like. The memory may be some other type device. The memory 104 includes a buffer memory 105 (sometimes referred to herein as buffer). The memory 104 may include an applications or functions storing section or function 106, e.g., a non-transitory memory, to store applications programs and functions programs or routines for carrying out operation of the mobile phone $1p$ via the controller 100. The memory 104 also may include a data storage section or function 107 to store data, e.g., contacts, numerical data, pictures, movies, and/or virtually any other data for use by the mobile phone 1. A drivers section 108 of the memory 104 may include various drivers for the mobile phone $1p$, for communication functions and/or for carrying out other functions of the mobile phone.

As is described further below, the buffer 105 may be used to save photographs from the camera 2 and/or for other purposes. The buffer 105 may be a part of the memory 104, e.g., specified address locations in a memory device, or part of the data storage section 107, etc., may be a separate memory device in the mobile phone $1p$, or may be otherwise provided to carry out the functions described further below.

The mobile phone $1p$ includes a telecommunications portion 110. The telecommunications portion 110 includes, for example, a communications module—transmitter/receiver 111 that receives incoming signals and transmits outgoing signals via antenna 112. The communications module—transmitter/receiver 111 is coupled to the controller 100 to provide inputs to and to receive output signals, as may be the case in conventional mobile phones. The communications module—transmitter/receiver 111 also is coupled to the speaker $9s$ and microphone $9m$ via an audio processor 113 to provide audio output via the speaker $9s$ and to receive audio input from the microphone $9m$ for usual telecommunications functions. The speaker $9s$ and microphone $9m$ enable a user to listen and to speak via the mobile phone $1p$. Audio data may be passed to the audio processor 113 from the memory 104 via the controller for playback to the user. The audio data may include, for example, audio data from an audio file stored in the memory 104 and retrieved by the controller 100. The audio processor 113 may include any appropriate buffers, decoders, amplifiers and the like.

The mobile phone $1p$ also includes a power supply 114 that may be coupled to provide electrical power to the operating circuitry 3 upon closing of the on/off switch 85.

For telecommunication functions and/or for various other applications and/or functions as may be selected from a GUI (graphical user interface) shown on the display 5 or via operating various keys 7, the mobile phone $1p$ may operate in a conventional way. For example, the mobile phone may be used to make and to receive telephone calls, to play back songs, pictures, videos, movies, etc., to take and to store photographs or video, to prepare, to save, to maintain, and to display documents and databases such as a contacts or other database, to browse the Internet, to maintain a calendar, etc.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

We claim:

1. An electronic equipment for capturing images, comprising:
    an image capturing device,
    a motion sensor configured to sense motion of the image capturing device,
    an analyzer configured to detect whether the sensed motion of the image capturing device is a predefined image capture motion,
    a stabilization detector configured to sense motion of the image capturing device and detect whether the image capturing device decelerates and stabilizes sufficiently to capture images without blurring due to motion,
    a controller configured to:
        cause the image capturing device to automatically capture images in response to the analyzer detecting that motion of the image capturing device sensed by the motion sensor corresponds to the predefined image capture motion,
        override the automatic capture of images to prevent capturing images until after the stabilization detector detects that the motion of the image capturing device has decelerated and stabilized sufficiently to capture images that are free of blur caused by motion, and
        receive a command from a user to program the image capturing device to store another predefined image capture motion when the motion sensor senses motion of the image capturing device by the user representing a predefined manner, and
    a non-transitory computer readable memory configured to store the represented predefined motion as another predefined image capture motion such that the controller causes the image capturing device to automatically capture images in response to the analyzer detecting the represented predefined motion.

2. The electronic equipment of claim 1, wherein:
    the controller is configured to cause the image capturing device to automatically focus the image capturing device for capturing an image; and
    the controller is further configured to prevent the image capturing device from automatically capturing images until after the automatic focusing has been performed.

3. The electronic equipment of claim 1, further comprising memory configured to store captured images in the memory.

4. The electronic equipment of claim 1, comprising a comparator configured to compare the sensed motion with the represented predefined motion.

5. The electronic equipment of claim 4, wherein the analyzer responds to sensing motion that is representative of decisively removing the image capturing device from a prescribed location.

6. The electronic equipment of claim 1, wherein the motion sensor comprises an accelerometer.

7. The electronic equipment of claim 1, wherein the controller is configured to cause images from the image capturing device to be recorded as a sequence of images in response to the analyzer detecting that the predefined image capture motion and the image capturing device is suitably focused and stable to record images.

8. The electronic equipment of claim 7, further comprising a shutter release, wherein the controller is configured to respond to the shutter release being operated by recording an image or ceasing the automatic recording of a sequence of images.

9. The electronic equipment of claim 8, wherein the electronic equipment includes a display, and the controller is configured to cause the display to display a sequence of automatically recorded images and an image recorded in response to operating of a shutter release of the image capturing device.

10. The electronic equipment of claim 9, wherein the controller is configured to discard automatically recorded images and stop image capturing in response to a function of the electronic equipment being selected other than an image capturing function.

11. The electronic equipment of claim 1, comprising a mobile phone.

12. The electronic equipment of claim 1, wherein the predefined image capture motion is a physical motion of the image capturing device from a position or location indicative of being in an idle state towards a position indicative of capturing images, initiating image capturing, setting up the image capturing device for image capturing, beginning to setup the image capturing device for image capturing, or commencing capturing images.

13. The electronic equipment of claim 1, wherein the controller causes the image capturing device to automatically capture images.

14. A method for capturing images, comprising
    sensing motion of an image capturing device,
    detecting whether the sensed motion of the image capturing is a predefined image capture motion,
    detecting whether the image capturing device decelerates and stabilizes sufficiently to capture images without blurring due to motion of the image capturing device,
    upon detecting that the sensed motion of the image capturing device corresponds to the predefined image capture motion, automatically capturing images only if the motion of the image capturing device has decelerated and stabilized sufficiently to capture images that are free of blur caused by motion of the image capturing device,
    receiving a command from a user to program the image capturing device to establish another predefined image capture motion,
    sensing the user moving the image capturing device in a decisive manner to establish another predefined image capture motion, and
    storing in a non-transitory computer readable memory a representation of the movement of the image capturing device in the decisive manner such that the image capturing device automatically captures images in response to detecting the another predefined image capture motion.

15. The method of claim 14, wherein:
upon detecting the predefined image capture motion, automatically focusing the image capturing device for capturing an image prior to detecting whether the image capturing device is suitably stable for capturing images without blurring due to motion;
commencing automatically capturing images after the automatic focusing has been performed and the image capturing device is detected as suitably stable for capturing images without blurring due to motion.

16. The method of claim 14, wherein detecting the predefined image capture motion comprises comparing the sensed motion with a representation of the predefined image capture motion.

17. The method of claim 14, wherein upon detecting the predefined image capture motion, automatically focusing the image capturing device for capturing an image, waiting for the image capturing device to be suitably stable for capturing images, and automatically recording a sequence of images.

18. The method of claim 17, further comprising in response to a shutter release of the image capturing device being operated, ceasing the automatic recording of the sequence of images, displaying a current image on a display of the image capturing device and recording the current image being displayed on the display.

19. The method of claim 14:
wherein the image capturing device is a camera or a mobile phone, and
further comprising while images are being automatically captured by the image capturing device, in response to a function of the camera or mobile phone being selected that is not a shutter release function, ceasing automatically capturing images and discarding images that were automatically recorded as a sequence of images immediately preceding selection of the function.

20. The method of claim 14, wherein the predefined image capture motion is a physical motion of the image capturing device from a position or location indicative of being in an idle state towards a position indicative of capturing images, initiating image capturing, setting up the image capturing device for image capturing, beginning to setup the image capturing device for image capturing, or commencing capturing images.

21. The method of claim 14, wherein the controller causes the image capturing device to automatically capture images.

* * * * *